United States Patent  [15] 3,637,396
Hollo et al.  [45] Jan. 25, 1971

[54] PROCESS FOR THE PRODUCTION OF FIBERLESS GREEN PLANT CONCENTRATE OF FULL BIOLOGICAL VALUE

[72] Inventors: Janos Hollo, 9, Guyon R. utca II; Istvan Zagyvai, 4, Maricz Zsigmond Korter; Lehel Koch, 19, Erkel F. utca, all of Budapest, Hungary

[22] Filed: July 30, 1969
[21] Appl. No.: 846,239

Related U.S. Application Data

[63] Continuation-in-part of Ser. No. 490,728, Sept. 27, 1965, abandoned.

[30] Foreign Application Priority Data

Sept. 28, 1964 Hungary...............................HO-836

[52] U.S. Cl. ..........................................99/9, 99/2 R, 99/2 N, 99/17, 195/82, 260/112
[51] Int. Cl. ..........................................................A23k 1/14
[58] Field of Search ..........................99/2, 9, 17, 14, 2 N, 2 E; 195/1, 32, 28, 29, 50, 82; 260/112, 112.5, 123.5

[56] References Cited

UNITED STATES PATENTS

| 2,600,903 | 6/1952 | Miller | ........................................99/2 |
| 2,809,113 | 10/1957 | Stimpson et al. | ............................99/9 |
| 3,151,038 | 9/1964 | Gray | ......................................195/1 X |

FOREIGN PATENTS OR APPLICATIONS

| 293,779 | 7/1928 | England | ....................................99/2 |
| 705,369 | 2/1950 | England | ....................................99/2 |

*Primary Examiner*—Norman Yudkoff
*Assistant Examiner*—Kenneth Van Wyck
*Attorney*—Young and Thompson

[57] ABSTRACT

High-protein plant extract is obtained by comminuting young green plant material, pressing the material to force liquid therefrom, and coagulating and separating the true protein fraction of this liquid. The remaining liquid, which can contain toxic substances, is inoculated with a yeast capable of utilizing nitrogen sources and subjected to aerobic fermentation until the nitrogen sources are substantially exhausted and the toxicants greatly reduced. The yeast is then concentrated, either by separation or by evaporation, and combined with the coagulated true protein thereby to obtain an extract which is detoxicated.

9 Claims, No Drawings

PROCESS FOR THE PRODUCTION OF FIBERLESS GREEN PLANT CONCENTRATE OF FULL BIOLOGICAL VALUE

This application constitutes a continuation-in-part of our copending application Ser. No. 490,728 filed Sept. 27, 1965, now abandoned.

The invention relates to a process for the production of a green plant concentrate of full biological value in a detoxicated form that can be used as concentrated fodder or as feedstuff, as well as of preparations containing this concentrate.

The aim of the researches concerning concentrated green fodders is to obtain such products which are nearly as good as and approach at least the biological value of protein fodders of animal provenance (e.g., fishmeal) and special protein fodders made of plant seed (e.g., soya, ground nut) and at the same time can economically be produced also from cultivated plants and possibly even from weeds occuring in masses.

According to the processes known so far, the comminuted matter of the domestical plants which have attained full growth, i.e., the so-called generative stage, or their parts are dried by means of flue gas of 600° to 700° C. inlet temperature and possibly milled if desired. (Advances in Agronomy, Vol. II., 1950). The drying process carried out in this way produces a considerable decrease in biological value, increasing thus the damage caused by the other operations. The product developed in this way has a disadvantageously high fiber content.

There is also another recommendation known which has however, not yet been initiated in practice and according to which a pulp of 12 to 13 percent dry matter content obtained from green domesticated plants by means of fine milling would be converted either into a nutriment of protein suitable for use as human food or into fodder by way of segregating therefrom the protein by means of heat coagulation (J.Sci. Food e.a. Agricult., 1961., pp. 502–512., Premier congres international des industries agricoles et alimentaires des zones tropicales et subtropicales. Abidjan, 13–19 décembre 1964.), or by drying the milling product (Agrártudomány I.,9.). Experiments have shown that these methods are likely to cause a considerable loss in the biological valuable substances, the final product being devoid not only of the polypeptides having a molecular weight less than 10.000, but also free amino acids as well as of other extremely valuable plant substances of vitamins soluble in water, of minerals and of carbohydrates as well. Thus, it could be stated that the average raw protein content of current concentrated fodders originating from green plants, or to be more precise, their raw fiber content being at least 17 percent, whereby 50 percent of the original protein and other nutriment content of the harvested plant or of the plant particles is lost in the course of the processing, as e.g., during the natural drying process.

At the same time there is a great number of plants which—on account of the components which are present therein mostly in a small quantity and which are of useful or deleterious physiological or sensory effect—can not be used for nutritive, that is for feeding purposes, or the use of which is significantly restricted.

One object of the present invention is to provide a process for preparing a green fodder concentrate in a substantially fiberless form.

Another object of the present invention is to provide a process for the preparation of a green fodder concentrate which contains all essential, important and useful ingredients except the fiber content of the green plant employed as raw material and at the same time to eliminate the deleterious accompanying ingredients or to reduce their concentration in the obtained fodder to a tolerable extent not influencing the utility of the product.

Yet another object of the present invention is to provide a process for the preparation of a green fodder concentrate which is suitable due to its low fiber content or in a substantially fiberless form for foddering monogastric animals and at the same time preserving all essential biological components of the green plant.

Still another object of the present invention is to provide a process which can be employed for the working up of various green plants or even weeds which have been considered previously unsuitable for foddering purposes.

Another object of the present invention is to provide a process to obtain green fodder concentrate which is rather simple to carry out from a technological point of view and at the same time ensures a considerable economic efficiency.

The science of nutrition and the fodder industry have the important task which has thus far not been accomplished of reducing the rate of the detrimental accompanying ingredients contained in the green plant serving for foddering purposes.

The most common detrimental accompanying substances present in most of the green plants used for foddering purposes are e.g., as follows:

a. Saponines, a part thereof having hemolytic effect on warm blooded animals (alfalfa);
b. mustard oils, in free form or in form of glucosides (rape, field kale);
c. coumarine and glucosides thereof (melilot);
d. alkaloids, as parts of the nitrogen fraction of the green plants, in addition nitrates, due to the effect of fertilizers;
e. aromatic substances and volatile oils, having in themselves no toxical effect, however undesirable from foddering viewpoints.

In addition to the detrimental accompanying substances mentioned above some of the green plants contain oxalic acid and oxalate (e.g., spinach, sorrel). The plant *Galega efficinalis*, which is a valuable raw material due to its high protein content, contains in considerable amounts guanidine and galegine (isoamyleneguanidine) which hinders its use as fodder raw material.

With a view towards reducing the accompanying substances there is known only the so-called plant-breeding method which is however unsuitable for solving the problem. The removal of the detrimental substances mentioned enables to employ such plant species for foddering purposes which have been considered previously as useless from the latter point of view.

On processing the green plants e.g., to one of the methods known to the art e.g., by means of drying, neither the fiberless form of the fodder, nor the reduction of the detrimental accompanying substances can be attained without considerable losses. Thus the presently known methods are unsuitable for preparing green plant extracts or concentrates in substantially fiberless form having full biological value containing all essential ingredients of the green plant, on the other hand they do not provide the removal of the accompanying detrimental substances, although this problem is very important to deal with.

British Pat. No. 705,369 discloses a process for the treatment of vegetable or animal matter by subjecting the raw material without comminution to pressure, separating the pressed liquid and coagulating this to recover the protein content thereof. The coagulated protein fraction is used as animal fodder, this fraction however contains only a part of the valuable ingredients inherent in a green plant. Therefore it cannot be considered as a full-grade animal fodder.

U.S. Pat. No. 2,600,903 relates only to the treatment of alfalfa and is in fact not adaptable to a wide range of green plant fodder material. According to this method freshly harvested alfalfa is pressed, the separated juices adjusted to an alkaline pH value and the liquid and solids components recovered thereafter separated. The juice obtained is promptly heated to inactivate the enzymes contained therein and then the suspended solids are separated again and concentrated. The process provides the isolation of certain substance-groups such as xantophylls, and carotenoid acids, mineral substances, however, all biological important components cannot be recovered in the main product obtained and the removal of the deleterious components is not foreseen although alfalfa contains some of them e.g., saponines and/or nitrates.

Considering the processes known to the art they start in general with a pressed juice obtained from green plants which contain the important nitrogen content of the green plants in form of various compounds. The nitrogen content of a green plant is commonly expressed in the raw protein content of a certain plant, which can be calculated by multiplicating the determined nitrogen content with 6.25. This raw protein rate of the green plant discloses the following fractions containing nitrogen:

a. true protein fraction (chloroplasts) containing polypeptides having a molecular weight more than 10.000, which can be coagulated under the action of heat, acid or heavy metal salts;
b. "amide-fraction" containing polypeptides having a molecular weight lower than 10.000, such as free amino acids, amides such as asparagine, glutamin etc.;
c. the "amide-fraction" contains the anorganic nitrates and ammonium salt as well which are also determined in the raw protein content of the starting green plant.

The "amide-fraction" inherent in the green plant cannot be converted to a more valuable protein fraction according to the conventional procedure although the heat coagulable true protein fraction is only about 30–50 percent of the total amount of nitrogen containing compound in the green plant. Therefore it is a very important task to transform the so-called "amide-fraction" or a part thereof into more valuable nutritive matter.

The present invention is based on a method, wherein substantially fiberless green plant extract of high biological value is prepared by comminuting green plant material which has not yet reached the generative stage, pressing the comminuted plant material to force a liquid therefrom, separating the liquid from the pressed cake, wetting the pressed cake with water, again pressing the pressed cake to separate further liquid, the improvement which consists of adding an antioxidant to the liquid and coagulating the true protein fraction thereof, separating the coagulated protein fraction from the liquid phase containing nitrogen sources which are substantially free from true protein, washing the coagulated precipitate with water and dilute acid, recombining the liquid phase with the washing liquids, inoculating the recombined liquid phase with a micro-organism capable to utilize nitrogen sources in form of nitrate and ammonia as well, subjecting the inoculated liquid phase to an aerob fermentation and aerating this until the nitrogen sources contained therein are substantially exhausted and concentrating the nitrogen containing matters in the liquid phase, recombining the concentrated liquid phase with the coagulated true protein fraction and drying it.

The coagulation of the true protein fraction is effected according to a preferred method under the action of heat on a temperature between 80° and 85° C.

As a micro-organism capable to utilize nitrogen sources in form of nitrate and ammonia preferably a micro-organism selected from the group consisting of the genus Hansenula, Candida, Saccharomyces, Ascomycetes, Phycomycetes and mixtures thereof is used.

The concentration of the liquid phase which contains nitrogen containing matters substantially free from true protein is effected by means of separation of the yeast suspension from the liquid phase. The concentration can be carried out by means of evaporating the water content of the liquid phase under vacuo as well.

The fermentation process can be carried out in two steps employing the same of different micro-organisms.

According to a preferred method of the present invention in order to increase the nitrogen content of the liquid phase subjected to aerob fermentation in the first step the fermentation is performed until the nitrogen sources inherent in the liquid phase are substantially exhausted, thereafter external nitrogen sources in form of ammonia or nitrate are added to the liquid phase and these are subjected to a repeated fermentation until the energy sources inherent in the liquid phase are substantially exhausted. In the latter case the nitrogen-containing matters of the liquid phase after fermentation are recombined with the coagulated true protein fraction and they are dried.

The basis of the process according to the invention is the recognition that it is possible to produce a green fodder extract which is fully equivalent to the aforesaid protein-carriers, that is to fishmeal, soya, ground nut, etc., and which—regarding its protein composition and biological value—is of even higher quality and can be extremely well stored for a long time without any decrease in value. The condition for the production of this preparation is the use of such a cultivated plant or even weeds or plant portions which are in a growing or vegetative stage, since it is in this stage that their protein content and quality come nearest to the animal proteins and also their content in biologically important substances is the most suitable. The biologically valuable complex substances are recovered thereof by such a method that the valuable substances are spared and the proteins are preserved to the maximum extent in the course of the method, whereby the fiber content of the preparation is practically removed at the same time.

The process consists in that as plant raw material, preferably green plants which are harvested prior to the generative stage, or any portions thereof are subjected to a coarse mechanical disintegration, then the material thus disintegrated is pressed in one or more steps, preferably with the first cake moistened with water. The material subjected to repeated pressing is moistened with water in a quantity preferably equivalent to 20 to 30 percent of the raw material. The pressing process is carried out preferably in two or three steps by means of one or not more than two imbibitions. The liquid is then separated for example by means of filtering from the fiber particles from the process. In given cases the pure liquid separated from the liquid obtained after the first pressing operation may also be applied as washing liquid. After the removal of the filamentary material (cellulose, hemicellulose, lignine) of the plants or plant portions, the resulting liquids—which are preferably united—form a practically homogeneous or a similar phase. An antioxidant in a rate equivalent to 0.5 to 4 per mille of the dry content based on the finished product is dissolved or dispersed in the liquid phase. As antioxidant preferably Santoquine (Dimethyletoxyquinoline) is used. The liquid phase is treated to cause the coagulation of the true protein content thereof. The coagulation is preferably carried out by heating the liquid to a temperature of about 80° and 85° C. The heat treatment exerts a double effect. In this way on the one hand the pasteurization of the liquid can be effected, on the other hand the true protein content inherent in the liquid can be coagulated and the coagulated precipitate can be separated from the liquid. The heat treatment is carried out by introducing directly steam into the liquid or in an indirect way in pasteurization equipments. After the coagulation the liquid is substantially free from the true protein fraction and the nitrogen content thereof is only in form of the "amide-fraction" referred to in the introductory part of the specification. The original nitrogen content of the liquid obtained by means of pressing green plants varies in a considerable etc., depending on the nature of the green plant to be processed and also varies depending from the different growth stage inside of one and the same green plant. The limits of the nitrogen content are as follows:

1. Plants containing carbohydrate in a considerable amount such as sorghum, sweet sorghum, wheat, Sudan grass (Sorghum vulgare sudanese) contain raw protein in a quantity of about 12–20 percent by weight calculated on the dry matter content, from which 6–10 percent by weight (that is 30–35 percent by weight of the raw protein content) is true protein.

2. Plants containing proteins in a considerable amount such as alfalfa etc., contain raw protein in a quantity of about 17–25 percent by weight calculated on the dry matter content.

Generally the heat coagulable true protein fraction of the total raw protein quantity is about 30–50 percent by weight. Most of the conventional procedures utilize only the heat coagulable fraction of the green plants whereas the remaining and valuable nitrogen-containing matters cannot be utilized or transformed into more valuable nitrogen sources.

The coagulated true protein fraction is separated from the liquid and is washed either with water or with diluted acid. The washing liquids are recombined with the liquid and cooled to a temperature of about 28°–30° C. This liquid is subjected to fermentation in a fermentation reactor suitable for aerob fermentation and equipped with a stirrer and aerating units. The liquid is inoculated with a micro-organism capable to utilize nitrogen sources in form of nitrates and ammonia. As micro-organism generally a yeast is used whether in form of stock culture or the yeast is separated from the previous principal fermentation step. The yeast is propagated under aerob conditions utilizing the nitrogen sources present in the liquid. The micro-organism is forced due to the absence of the true protein fraction, to utilize the nitrogen sources having a lower biological value, i.e., the so-called "amide-fraction." Thus the "amide-fraction" can be transformed to a more valuable nitrogen-containing substance which has increased biological value. The propagation of the yeast under aerob conditions is the main process taking place in the course of which the growing factors necessary for the propagation are taken from the liquid. As energy sources for the propagation of the yeast serve the carbohydrate fractions of the liquid especially the reducing sugars, in addition plant acids may serve as energy sources as well. In the course of the fermentation the deleterious accompanying substances present in the liquid such as saponines, mustard oils etc., are also utilized as energy sources, therefore the original contents thereof can be reduced to a tolerable extent in the liquid phase. During the fermentation a foam-reducing additive such as silicone oil or sulfonated and neutralized sunflower oil can be incorporated in the liquid in an amount 50–100 ml./cubic meter.

In case of green plants containing in an increased amount carbohydrates, such as Sorghum species etc., the carbohydrate contents thereof serve as energy source whereas in case of green plants containing increased amounts of protein such as alfalfa, field kale etc., the carbon fraction e.g., plant acids serve as energy source. The mineral substances and other necessary components for the propagation of yeast are originally inherent in the pressed liquid.

The aeration of the liquid (fermentation broth) is carried out continuously, in the first stage of the fermentation 30 cubic meter air per cubic meter fermentation broth is applied, later on the amount of air necessary for the fermentation is regulated according to the requirements of the yeast employed.

Parallel with the propagation of the yeast the nitrogen content of the fermentation broth diminishes. At a point, where the quantity of the nitrogen-containing substances diminishes to a certain value, the propagation of yeast is finished and the autolysis of the yeast begins. The fermentation generally is continued until the beginning of the autolysis of the yeast, because this ensures in case of suitable aeration of the liquid the consuming of the nitrogen sources present. According to our experiences when 60 percent of the original nitrate content of the liquid is consumed, then the quantity of the undesired accompanying substances such as saponines mustard oils etc., diminishes to 10–15 percent of the starting value. This latter period of time is defined as detoxication period. The reduction of the original nitrate content indicates the consuming of the other undesired substances and at the same time the conversion of the "amide-fraction" present at the starting of the fermentation into a more valuable nitrogen fraction.

The fermentation can be accomplished with one yeast species or with a mixture of various yeast species. Thus e.g., species of the genus Saccharomyces and Candida can be applied together. Sometimes it proves useful to start the fermentation with a certain yeast species and accomplishing it with another yeast species. The selection of the appropriate yeast species depends on the nature of the green plant to be processed and those skilled in the art can choose the most appropriate yeast species for each green plant.

The average composition of the liquid phase before and after fermentation is illustrated in the following

TABLE

| Substance | Before Fermentation | After Fermentation |
|---|---|---|
| $NH_2$-nitrogen g./l. | 0.25—0.40 | 0.04—0.06 |
| $NH_4$-nitrogen g./l. | 0.12—0.20 | 0.015—0.025 |
| Nitrate nitrogen mg./l. | 150—300 | 50—90 |
| Reducing sugars g./l. | 4.0—50.0 | 0.5—2.5 |
| Yeast dry matter content g./l. | traces | 7.00—25.00 |
| Saponines mg./l. | 0.12—0.20 | 0.01—0.02 |
| Mustard oils mg./l. | 2.0—4.0 | 0.01—0.02 |

As a result of the fermentation the original raw protein content of the starting liquid does not increase in an absolute sense only then if the liquid after fermentation, that is after consuming the original nitrogen sources still contains a considerable quantity of energy sources such as carbohydrates etc. In order to utilize these energy sources and to transform them to a more valuable nitrogen fraction ammonia or ammonium salts may be added to the fermentation broth, thus the ammonia may be converted into yeast-protein consequently the final protein content of the product can be enhanced. The most essential feature of the instant process is to be seen therein that the nitrogen content of the green plant having a low biological value may be converted in an extent to 60–80 percent into a more valuable nitrogen fraction from the viewpoint of foddering.

Experiments show that the fermentation process can be accomplished within 4–6 hours and during this period of time the undesired accompanying substances can be eliminated or at least the amount thereof can be reduced to a tolerable extent. In some cases the pH value of the fermentation liquid should be adjusted before fermentation or during fermentation depending on the requirements of the micro-organism employed.

The working up of the fermented liquid can be carried out by separating e.g., the mass of yeast cells in a mechanical way from the liquid, heating the separated portion to a temperature to about 85° C. and recombining this with a coagulated true protein fraction. The separated liquid obtained after removal of the mass of yeast cells can be mixed either to the fiberless end product or to the fibrous press cake. According to a preferred embodiment of the instant process the fermented liquid is evaporated in vacuo and the residue obtained is recombined with the coagulated true protein fraction.

The recombined protein-rich fraction is finally granulated or pressed to a cake or to another usual press product either alone or together with other fodder and nutriment.

The fibrous press cake obtained as byproduct is not valueless, because it can be utilized alone as low grade hay for the purpose of ruminants when completed preferably with urea.

The invention is illustrated by the following examples without limiting however the process of invention to the examples mentioned hereinafter.

EXAMPLE 1

Ten tons of rye, harvested prior to forming corn at latest however 2 weeks after blossoming, was subjected to an aqueous washing in order to eliminate the stone and iron contaminant. The washed material was then coarsely disintegrated. The disintegrated material was then pressed.

In the event of partly applying batch-type presses the procedure was accomplished as follows:
  a. Discontinuous-type low-pressure press (e.g., winepress) was applied as preliminary press,
  b. Discontinuous or continuous-type high-pressure press (e.g., screw press for vegetable oils) was used as final press.

The disintegrated material was charged into press (a) having a basket volume e.g., 40 hectoliters. About 2.5–3.0 metric tons of rye may be charged into a basket of this size. Thus, the raw material may be processed by means of four consecutive chargings. The material in the primary press (a) was pressed until it had reached a yield in liquid of about 50 percent, by starting with a low pressure of 1 kg. per sq. cm. Pressing was continued until the yield in liquid falls below 5 to 10 l./min./t., the press cake was then loosened and the subsequent pressing was effected at a higher pressure (2 to 3 kg. per sq. cm.) This operation was repeated at a higher pressure.

The press-cake amounting to about 12 to 15 tons according to what was said before, was discharged from the machine in the following way: the loosened press-cake was sprinkled with water, that is 10 to 30 percent of the raw material (with altogether two imbibitions), in the present case 500 kg. After the wet treatment the material was aged preferably for an hour until further processing, then charged, after the secondary disintegration, into a press of similar type and working under similar service conditions.

Should the aim be to obtain a yield in extract content exceeding 90 percent of the raw material (without taking the fiber content into account), another imbibition should be made which was followed by a pressing operation. The press-cake discharged from the preliminary press, amounting to 25 to 30 percent of the raw material, was charged into a discontinuous or continuous-type high-pressure final press in order to recover—together with the nutritive materials—a part of the moisture content of about 50 percent. Thus, the moisture content of the press-cake was reduced to such a degree that it may have been dried to a moisture content of 14 percent, without any particular thermal energy consumption. The temperature of the press-cake having a moisture content of about 30 percent, discharged from the high-pressure final press, was from 50° to 70° C., thus the drying of same required practically only the power for ventilating.

By this method 8 to 10 tons of liquid could be obtained from 10 tons of rye, this liquid containing 90 percent of the nonfibrous dry content of the processed plant material. Thereafter, the liquid was separated from the fiber particles, from the press, by having made these pass through a screen of 0.5–1 mm. mesh. To the obtained liquid a small quantity of antioxidant was added first (0,5 percent based on the dry content), and then the concentrate was adjusted to the antioxidant level as required.

The separated liquid was heated to a temperature of 85° C. and the coagulated true protein fraction containing the chloroplasts was separated. Having started with 8–10 tons of pressed juice 1.5–2 tons of wet precipitate could be obtained having a dry matter content of about 20–25 percent by weight. The precipitate was washed with water and dilute acid in a quantity of about 10–15 percent by weight calculated on the amount of the precipitate and the washing liquids were reunited with a juice obtained after separation of the true protein fraction (liquid phase). The liquid phase was adjusted to a pH value of 4.5–5 and was aerated under mixing. The temperature of the liquid phase was diminished to about 28° C. in a heat exchanger and was inoculated with a yeast called *Candida utilis*, which has been taken either from a stockculture or from a broth being in stage of principle fermentation. The quantity of the inoculum was 1 kg. yeast dry matter calculated on each ton of the liquid phase. After inoculating the broth the aeration was started with a large excess of air which was 30 cubicmeter air per cubicmeter of broth per hour. The rate of aeration was reduced 1 hour after inoculating the broth according to the required quantity of the growth. As foam reducing additive a sulfonated and neutralized sunflower oil was used. The pH value of the broth was controlled during a period of 4 hours after starting the yeast propagation. In the sixth hour of the fermentation the increase in number of yeast cells begins to stagnate, then the pH value of the broth increased and the content of the broth in reducing sugars diminished as low as 2 g./l. The aeration of the broth was heated in order to promote the thermolysis of the yeast. The evaporation of the broth was carried out at a temperature of 50°–140° C. until the residue contained 60 percent by weight dry matter content. The residue was recombined with the coagulated true protein fraction and spray dried in a usual manner.

According to another variation of the process the fermentation was accomplished in the following way.

In case it is desirable to diminish the total energy sources present in the broth to an extent of 2 g./l. ammonia or ammonium salt were added to the broth in order to prevent the autolysis of the yeast and the increase of the pH value.

The composition of the dried products obtained according to the described two variation of the process is illustrated in the following table.

| Ingredients | Without fermentation | According to the 1st variation (fermentation period 6–8 hours) | According to the 2nd variation (consuming all energy sources) |
| --- | --- | --- | --- |
| Raw protein % | 15–20 | 30–35 | 40–45 |
| True protein % (from raw protein) | 7–11 | 18–22 | 28–32 |
| Raw fibers % | 1 | 1 | 1 |
| Raw fat % | 1,5 | 2,0 | 2,5 |
| N-free extract % | 60–65 | 40–45 | 35–40 |
| Mineral substances % | 10–13 | 12–18 | 15–20 |

The yield obtained in dried product was about 0.8–1.4 tons depending on the rate of the biological conversion.

EXAMPLE 2

Ten tons of alfalfa was harvested before blossoming and was processed according to the method described in example 1. The pH value of the pressed juice was adjusted to about 6–7 and inoculated with *Hansenula anomala*. The fermentation was continued until the original nitrogen sources have been exhausted, then the broth was heated to about 85° C. and the mass of yeast cells separated. During the separation a wet solid matter was obtained which was intermixed with a coagulated true protein fraction whereas the dilute juice arising from the separation has been evaporated and the obtained concentrate was added to the fiber containing byproduct before drying thereof. The composition of the dried end product is illustrated herebelow:

| Ingredients | Without fermentation | With fermentation |
| --- | --- | --- |
| Raw protein % | 35.0 | 40–45 |
| True protein % (from raw protein) | 16–18 | 28–32 |
| Raw fiber % | 1.0 | 1.0 |
| Raw fat % | 3.0 | 3.5 |
| N-free extract % | 40–45 | 35–40 |
| Ash % | 15–20 | 12–18 |

The yield obtained in dried product was about 1.2–1.6 tons.

EXAMPLE 3

Ten tons of field kale (*Brassica oleracea*) was processed according to the method described in example 1. The pressed juice was fermented after inoculation with a yeast called *Candida utilis*. When the reducing sugar content of the juice during fermentation was diminished to about 5 g./l., which coincided with the point of time when the pH change occurred, the mass of yeast cells accumulated in the broth were separated and after heat treatment they were intermixed with the coagulated true protein fraction. The pH value of the separated juice was adjusted thereafter to about 6.5 and inoculated with a yeast called *Hansenula suaveolens* and the aeration of the broth was started. The quantity of the yeast employed as inoculum was 1 kg. per cubicmeter broth. The fermentation was continued for 3 hours thereafter and the mass of yeast cells were separated and again intermixed with the true protein fraction. The separated juice was evaporated and the residue recombined with the fiber containing byproduct before drying.

The recombined protein fractions were spray dried.

The yield obtained from 10 tons of field kale was about 0.7 ton dried product. The composition of the dried end product was as follows:

| Ingredients | Without fermentation | With fermentation |
| --- | --- | --- |
| Raw protein % | 28–32 | 45–50 |
| true protein % (from raw protein) | 12–15 | 34–38 |
| Raw fiber % | 1 | 1 |
| Raw fat % | 1.0–1.5 | 1.5–2.0 |
| N-free extract % | 45–50 | 35–40 |
| Ash % | 18–20 | 10–15 |

EXAMPLE 4

Ten tons of *Sorghum saccharatum* was processed according to the method described in example 1. The pressed juice was inoculated with two species of yeast called *Saccharomyces cerevisiae* and *Candida utilis* in a quantity of 1 kg./cubic meter juice. When the reducing sugar content of the broth diminished to a value below 1 g./l. the broth was heated to about 85° C., the yeast cells were separated and recombined with the true protein fraction after separation.

The yield obtained was about 1.2–1.4 tons of dried end product having a raw protein content of about 35–40 percent by weight.

What we claim is:

1. In a method for preparing substantially fiberless green plant extract of high biological value by comminuting green plant material which has not yet reached the generative state, pressing the comminuted plant material to force a liquid therefrom, separating the liquid from the pressed cake, wetting the pressed cake with water, again pressing the pressed cake to separate further liquid, adding an antioxidant to the liquid and coagulating the true protein fraction thereof, separating the coagulated protein fraction from the liquid phase containing nitrogen sources which are substantially free from true protein; the improvement comprising washing the coagulated precipitate with water and dilute acid, recombining the liquid phase with the washing liquids, inoculating the recombined liquid phase with a micro-organism capable to utilize nitrogen sources in form of nitrate and ammonia as well as subjecting the inoculated liquid phase to an aerob fermentation and aerating this until the nitrogen sources contained therein are substantially exhausted and concentrating the nitrogen containing matter in the liquid phase, recombining the concentrated liquid phase with the coagulated true protein fraction and drying it, thereby to obtain said extract in a detoxicated form.

2. A process according to claim 1, wherein the coagulation of the true protein fraction is effected under the action of heat on a temperature between 80°–85° C.

3. A process according to claim 1, wherein as micro-organism a species selected from the genus consisting of Hansenula, Candida, Saccharomyces, Ascomycetes, Phycomycetes, and mixtures thereof is used.

4. A process according to claim 1, wherein the concentration of the liquid phase after fermentation is effected by means of separation of the mass of yeast cells accumulated in the liquid phase.

5. A process according to claim 1, wherein the concentration of the liquid phase after fermentation is effected by means of evaporating the water content of the liquid phase under vacuo.

6. A process according to claim 1, where in the aerob fermentation of the liquid phase is carried out in two steps employing the same or different micro-organism.

7. In a method for preparing substantially fiberless green plant extract of high biological value by comminuting green plant material which has not yet reached the generative state, pressing the comminuted plant material to force a liquid therefrom, separating the liquid from the pressed cake, wetting the pressed cake with water, again pressing the pressed cake to separate further liquid, adding an antioxidant to the liquid and coagulating the true protein fraction thereof, separating the coagulated protein fraction from the liquid phase containing nitrogen sources which are substantially free from true protein; the improvement comprising washing the coagulated precipitate with water and dilute acid, recombining the liquid phase with the washing liquids, inoculating the recombined liquid phase with a micro-organism capable to utilize nitrogen sources in form of nitrate and ammonia, subjecting the inoculated liquid phase to an aerob fermentation and aerating this until the nitrogen sources contained therein are substantially exhausted, adding nitrogen sources to the liquid phase in form of ammonia or ammonium salts, subjecting the liquid phase to a repeated fermentation until the energy sources thereof are substantially exhausted, separating the mass of yeast cells obtained from the liquid and recombining it after heat treatment with the coagulated true protein fraction and drying it, thereby to obtain said extract in a detoxicated form.

8. A process according to claim 7, wherein the mass of yeast cells is separated before the addition of external nitrogen sources.

9. A process according to claim 7, wherein as inoculum one or several micro-organisms capable to utilize nitrogen sources in form of ammonia and nitrate as well are employed.

* * * * *